UNITED STATES PATENT OFFICE.

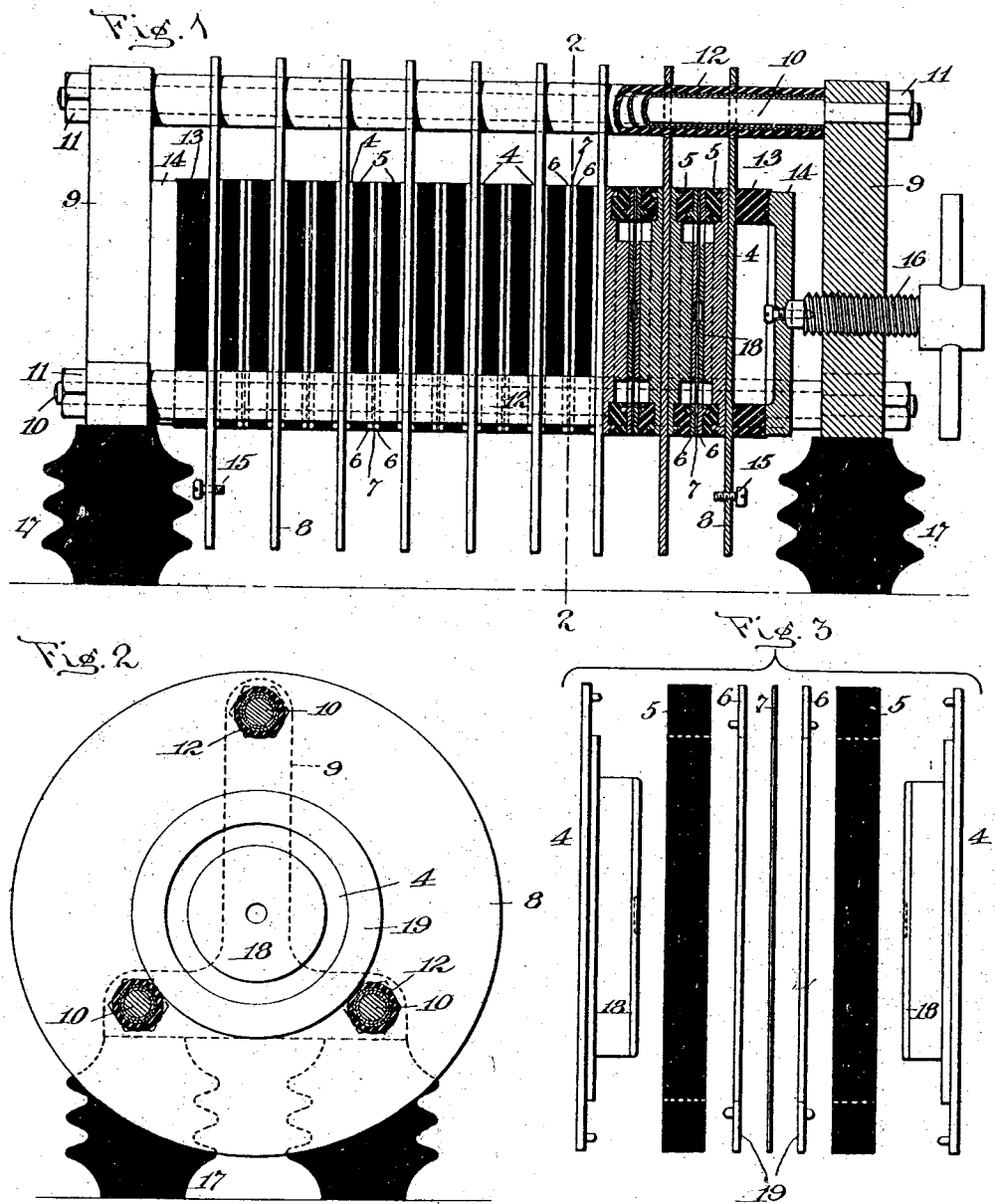

RICHARD PFUND, OF NEW YORK, N. Y.

QUENCHED SPARK-GAP.

1,161,520.  Specification of Letters Patent. Patented Nov. 23, 1915.

Application filed December 30, 1913. Serial No. 809,436.

*To all whom it may concern:*

Be it known that I, RICHARD PFUND, a citizen of the United States, and a resident of the city and State of New York, have invented a certain new and useful Improvement in Quenched Spark-Gaps, of which the following is a specification.

My invention relates to quenched spark-gaps used in the transmission of electromagnetic wave energy, and has for its object the elimination of the thin and on that account flimsy, easily damaged and expensive insulating and more or less heat resisting spacing washers or gaskets made necessary by the various forms of quenched spark-gaps heretofore used and the replacing of such flimsy insulating spacing washers or gaskets by spacing washers or gaskets of metal. The length of each gap of a quenched spark-gap is in the neighborhood of 0.01 of an inch and with the forms of gap heretofore used the insulating spacing washers or gaskets must have a uniform thickness equal to this length and must be capable of withstanding a difference of potential of at least 1,000 volts and furthermore must not vary in thickness to any appreciable extent when subjected to the degree of compression employed when the gaps are set up for use. It is obvious that such thin and uniform insulating spacing washers or gaskets of, for instance, mica, rubber, paper or other similar material as have been used for that purpose, are not only difficult to make, but are very fragile and easily damaged in handling and by the heat of the gap, while on the other hand, metal spacing washers or gaskets of equal thickness are not only easily obtained of the uniform thickness required, but will also stand considerable rough handling and are not affected by the heat of the gap and are, therefore, very much cheaper and very much more durable than any other material. With metal spacing washers it is also possible, on account of their not being affected by the degree of compression employed, to obtain gaps of absolutely constant, uniform and equal length which is of great importance in producing perfect signals.

In the accompanying drawings: Figure 1 is a side elevation and partial section of a complete quenched spark-gap of eight separate units embodying my invention. Fig. 2 is a transverse section on line 2—2 of Fig. 1; and Fig. 3 is a side elevation of the two halves of one of the spark-gap units with the parts separated.

As shown in Fig. 1, the complete quenched spark-gap consists of a series of separate removable units or gaps, each made of two halves and each half consisting of a metal base plate 4, insulating ring 5 and metal ring 6 on top of the insulating ring. Between the two halves of the gap is the metal spacing washer or gasket 7 clamped between the metal rings 6 of the adjoining halves of the gap. Between the different individual complete units or spark-gaps, as shown in Fig. 1, are cooling plates 8 for absorbing and radiating the heat produced by the spark, and these cooling plates, together with the spark-gap units, are supported in a metal frame. The metal frame consists of inverted T-shaped end pieces 9, held together by metal rods 10 and nuts 11, the metal rods being covered with insulation 12, which may be of glass, porcelain, fiber, rubber or similar material, or a combination of such materials. As shown, the cooling plates and the spark-gap units are supported on the metal rods 10, and are insulated from these rods by the insulation 12 and from the metal ends of the frame by the additional insulation 13 on the inner faces of the metal spacing plates 14. The terminals 15, attached to the two outside cooling plates 8, are for connecting the complete quenched spark-gap in circuit. A screw 16 passing through one end of the supporting frame compresses the spark-gap units, the spacing washers or gaskets 7 and the cooling plates 8 in order to make all the gaps of uniform length, *i. e.*, equal in length to the thickness of the spacing washers or gaskets 7, and to insure perfect contact between the different units, the adjacent cooling plates and the terminals. The supporting frame is mounted upon insulators 17, by means of which it is insulated from the ground and other parts of the circuit. It will, of course, be understood that the particular form of frame and the exact arrangements described and illustrated for supporting and compressing the individual units and the cooling plates and other parts are not essential to the operation of the apparatus, but merely indicate a convenient way in which the apparatus may be arranged. The construction of the individual spark-gap units, however, which makes it possible to engage metal spacing washers or gaskets between the two halves of each gap in place of spacing washers or gaskets of insulating material heretofore used, constitutes my present invention. This construction is made clear from the drawings. The shape of the complete spark unit is circular. The base plate 4 of each half of the spark gap is preferably of copper on account of its high heat conductivity. The insulating ring 5 is attached to the base plate 4 by means of screws, studs, cement or in any other approved manner, and the insulating material employed for the rings 5 may be fiber, or like material, or glass or porcelain, or material of similar character. The metal ring 6, attached to the face of each insulating ring 5, may be of brass or copper and attached to the ring 5 in a manner similar to the attachment of that ring to the base plate, with the precaution, however, that if metal screws or studs are used, such screws or studs should make no connection between the metal base plate 4 and the metal ring 6, and that they be far enough apart not to impair the insulation between the base plate and the ring 6 below that required to safely withstand not less than one-half the difference of potential at each gap. The spacing washer or gasket 7 is of metal approximately 0.01 of an inch thick, and this gasket is clamped between the metal rings 6 of the two halves of the complete unit when the units are set up in the frame and pressure applied by screw 16. The spacing washer or gasket 7 is made of substantially the same inside and outside diameter as the ring 6. I have found that ordinary German silver is readily obtainable in the market of the required uniform thickness to form the spacing washers 7, and that it appears to answer the purpose very well, although of course any other metal, if of sufficient strength and uniformity, would also serve. The active surfaces 18 of each gap are made of silver, or metal of similar high heat conductivity, or of tungsten or similar metals having a low vapor pressure and these active surfaces are attached to the base plates 4 by means of solder or in other approved ways which will insure their making as perfect and uniform contact as possible with the base plates. The active surface 18 and the surface 19 of the metal ring 6 of each half of the spark-gap unit are turned off to be in exact alinement, and if this is done, it is seen that when the metallic spacing washer or gasket 7 is placed between the two halves of each complete unit, as shown in Fig. 1, and the two halves are pressed together, the space between the active surfaces 18 will be equal to the thickness of the spacing washer or gasket 7, and if the unit has been properly constructed, and the spacing washers or gaskets 7 are of the required and easily obtained uniform thickness and of sufficient hardness so as not to be easily pressed out of shape by the moderate pressure employed, the active surfaces 18 will be exactly parallel to each other. A slight depression in the center of each active surface 18, as shown in the drawing, has been found to be desirable, and should also be provided. Although brass is frequently used for the cooling plates 8, I have found it advantageous to employ copper on account of its very superior heat conducting and when oxidized or blackened, heat radiating properties. There is, therefore, greater efficiency in keeping the gaps cool and improving the quenching action.

I do not wish to limit myself to the exact shape and dimensions or the exact construction shown, but merely use them to illustrate the principle of my invention. For instance, the metal ring 6 on top of the insulating ring 5 is not absolutely essential. It is, however, a desirable feature in order to provide two metal surfaces, i. e., the active surface 18 and the surface of the ring 6, so that when it becomes necessary to clean or re-polish the active surface 18, this can be done by rubbing the face of the unit on the cleaning surface (such as crocus cloth), the two surfaces 6 and 18 bearing on the cleaning surface and being rubbed down together and to the same extent. The alinement between the active surface 18 and the surface of the ring 6 will thus be maintained, and this is important in order to insure the length of the gap being equal to the thickness of the spacing washer or gasket and of uniform length over its entire surface.

I claim:—

1. A portion of a quenched spark gap unit, having a metal base plate, with a projecting active surface on one side of the same, and a ring of insulating material in contact with the same side of said base plate and surrounding the active surface, and lying wholly within the periphery of the base plate, and with the plane of the active surface extending to at least the plane of the ring of insulating material.

2. A portion of a quenched spark gap unit, having a metal base plate, with a projecting active surface on one side of the same, and a ring of insulating material in contact with the same side of said base plate and surrounding the active surface and out of contact with the same, and lying wholly within the periphery of the base plate, and with the plane of the active surface extending to at least the plane of the ring of insulating material.

3. A portion of a quenched spark gap unit, having a metal base plate, with a projecting active surface on one side of the same, and a ring of insulating material in contact with the same side of said base plate and secured thereto, and surrounding the active surface, and lying wholly within the periphery of the base plate, and with the plane of the active surface extending to at least the plane of the ring of insulating material.

4. A portion of a quenched spark gap unit, having a metal base plate, with a projecting active surface on one side of the same, and a ring of insulating material in contact with the same side of said base plate and secured thereto, and surrounding the active surface, and out of contact with the same, and lying wholly within the periphery of the base plate, and with the plane of the active surface extending to at least the plane of the ring of insulating material.

5. A portion of a quenched spark-gap unit, having a metal base plate, with a projecting active surface on one side of the same, and a ring of insulating material in contact with the same side of said base plate and surrounding the active surface, said base plate serving as the support for the said insulating material, and with the plane of the active surface extending to at least the plane of the ring of insulating material.

6. A portion of a quenched spark-gap unit, having a metal base plate, with a projecting active surface on one side of the same, and a ring of insulating material in contact with the same side of said base plate and surrounding the active surface and out of contact with the same, said base plate serving as the support for the said insulating material, and with the plane of the active surface extending to at least the plane of the ring of insulating material.

7. A portion of a quenched spark-gap unit, having a metal base plate, with a projecting active surface on one side of the same, and a ring of insulating material in contact with the same side of said base plate and secured thereto, and surrounding the active surface, said base plate serving as the support for the said insulating material, and with the plane of the active surface extending to at least the plane of the ring of insulating material.

8. A portion of a quenched spark-gap unit, having a metal base plate, with a projecting active surface on one side of the same, and a ring of insulating material in contact with the same side of said base plate and secured thereto and surrounding the active surface, and out of contact with the same, said base plate serving as the support for the said insulating material, and with the plane of the active surface extending to at least the plane of the ring of insulating material.

9. A portion of a quenched spark-gap unit, having a metal base plate, with a projection on one side having an active surface, and a ring of insulating material in contact with the same side only of said base plate, and surrounding the active surface, and with the plane of the active surface extending to at least the plane of the ring of insulating material.

10. A portion of a quenched spark-gap unit, having a metal base plate, with a projection on one side having an active surface, and a ring of insulating material in contact with the same side only of said base plate, and surrounding the active surface and out of contact with said projection, and with the plane of the active surface extending to at least the plane of the ring of insulating material.

11. A portion of a quenched spark-gap unit, having a metal base plate, with a projection on one side having an active surface, and a ring of insulating material in contact with the same side only of said base plate, and secured thereto, and surrounding the active surface, and with the plane of the active surface extending to at least the plane of the ring of insulating material.

12. A portion of a quenched spark-gap unit, having a metal base plate, with a projection on one side having an active surface, and a ring of insulating material in contact with the same side only of said base plate and secured thereto, and surrounding the active surface, and out of contact with the said projection, and with the plane of the active surface extending to at least the plane of the ring of insulating material.

13. A portion of a quenched spark gap unit, having a metal base plate, with a projecting active surface on one side of said plate, a ring of insulating material in contact with the same side of said base plate and surrounding the active surface, and lying wholly within the periphery of the base plate, and a metal ring on the side of the insulating ring opposite from the base plate, and out of contact with the active surface.

14. A portion of a quenched spark gap unit, having a metal base plate, with a projecting active surface on one side of said plate, a ring of insulating material in contact with the same side of said base plate and surrounding the active surface, and out of contact with the same, and lying wholly within the periphery of the base plate, and a metal ring on the side of the insulating ring opposite from the base plate and out of contact with the active surface.

15. A portion of a quenched spark gap unit, having a metal base plate, with a projecting active surface on one side of said plate, a ring of insulating material in contact with the same side of said base plate and secured thereto, and surrounding the active surface, and lying wholly within the periphery of the base plate, and a metal ring on the side of the insulating ring opposite from the base plate, and out of contact with the active surface.

16. A portion of a quenched spark gap unit, having a metal base plate, with a projecting active surface on one side of said plate, a ring of insulating material in contact with the same side of said base plate and secured thereto, and surrounding the active surface, and out of contact with the same, and lying wholly within the periphery of the base plate, and a metal ring on the side of the insulating ring opposite from the base plate, and out of contact with the active surface.

17. A portion of a quenched spark-gap unit, having a metal base plate, with a projecting active surface on one side of said plate, a ring of insulating material in contact with the same side of said base plate and surrounding the active surface, said base plate serving as the support for the said insulating material, and a metal ring on the side of the insulating ring opposite from the base plate, and out of contact with the active surface.

18. A portion of a quenched spark-gap unit, having a metal base plate, with a projecting active surface on one side of said plate, a ring of insulating material in contact with the same side of said base plate and surrounding the active surface, and out of contact with the same, said base plate serving as the support for the said insulating material, and a metal ring on the side of the insulating ring opposite from the base plate and out of contact with the active surface.

19. A portion of a quenched spark-gap unit, having a metal base plate, with a projecting active surface on one side of said plate, a ring of insulating material in contact with the same side of said base plate and secured thereto, and surrounding the active surface, said base plate serving as the support for the said insulating material, and a metal ring on the side of the insulating ring opposite from the base plate, and out of contact with the active surface.

20. A portion of a quenched spark-gap unit, having a metal base plate, with a projecting active surface on one side of said plate, a ring of insulating material in contact with the same side of said base plate and secured thereto, and surrounding the active surface, and out of contact with the same, said base plate serving as the support for the said insulating material, and a metal ring on the side of the insulating ring opposite from the base plate, and out of contact with the active surface.

21. A portion of a quenched spark-gap unit, having a metal base plate, with a projection on one side having an active surface, and a ring of insulating material in contact with the same side only of said base plate, and surrounding the active surface, and a metal ring on the side of the insulating ring opposite from the base plate, and out of contact with the active surface.

22. A portion of a quenched spark-gap unit, having a metal base plate, with a projection on one side having an active surface, and a ring of insulating material in contact with the same side only of said base plate, and surrounding the active surface, and out of contact with the same, and a metal ring on the side of the insulating ring opposite from the base plate, and out of contact with the active surface.

23. A portion of a quenched spark-gap unit, having a metal base plate, with a projection on one side having an active surface, and a ring of insulating material in contact with the same side only of said base plate and secured thereto, and surrounding the active surface, and a metal ring on the side of the insulating ring opposite from the base plate, and out of contact with the active surface.

24. A portion of a quenched spark-gap unit, having a metal base plate, with a projection on one side having an active surface, and a ring of insulating material in contact with the same side only of said base plate and secured thereto, and surrounding the active surface, and out of contact with the same, and a metal ring on the side of the insulating ring opposite from the base plate, and out of contact with the active surface.

25. A quenched spark gap unit, composed of two similar halves, each having a metal base plate, with a projecting active surface on one side of said plate, a ring of insulating material in contact with the same side of said plate and surrounding the active surface, and lying wholly within the periphery of the base plate, in combination with a metal spacing washer or gasket compressed between such two halves.

26. A quenched spark gap unit, composed of two similar halves, each having a metal base plate, with a projecting active surface, on one side of said plate, a ring of insulating material in contact with the same side of said plate, and surrounding the active surface, and out of contact with the same, and lying wholly within the periphery of the base plate, in combination with a metal spacing washer or gasket compressed between such two halves.

27. A quenched spark gap unit, composed of two similar halves, each having a metal base plate, with a projecting active surface on one side of said plate, a ring of insulating material in contact with the same side of said plate and secured thereto, and surrounding the active surface, and lying wholly within the periphery of the base plate, in combination with a metal spacing washer or gasket compressed between such two halves.

28. A quenched spark gap unit, composed of two similar halves, each having a metal base plate, with a projecting active surface on one side of said plate, a ring of insulating material in contact with the same side of said plate and secured thereto, and surrounding the active surface, and out of contact with the same, and lying wholly within the periphery of the base plate, in combination with a metal spacing washer or gasket compressed between such two halves.

29. A quenched spark-gap unit, composed of two similar halves, each having a metal base plate, with a projecting active surface on one side of the same, and a ring of insulating material in contact with the same side of said base plate and surrounding the active surface, said base plate serving as the support for the said insulating material, and with the plane of the active surface extending to at least the plane of the ring of insulating material, in combination with a metal spacing washer or gasket compressed between such two halves.

30. A quenched spark-gap unit, composed of two similar halves, each having a metal base plate, with a projecting active surface on one side of the same, and a ring of insulating material in contact with the same side of said base plate, and surrounding the active surface, and out of contact with the same, said base plate serving as the support for the said insulating material, and with the plane of the active surface extending to at least the plane of the ring of insulating material, in combination with a metal spacing washer or gasket compressed between such two halves.

31. A quenched spark-gap unit, composed of two similar halves, each having a metal base plate, with a projecting active surface on one side of the same, and a ring of insulating material in contact with the same side of said base plate, and secured thereto, and surrounding the active surface, said base plate serving as the support for the said insulating material, and with the plane of the active surface extending to at least the plane of the ring of insulating material, in combination with a metal spacing washer or gasket compressed between such two halves.

32. A quenched spark-gap unit, composed of two similar halves, each having a metal base plate, with a projecting active surface on one side of the same, and a ring of insulating material in contact with the same side of said base plate and secured thereto, and surrounding the active surface, and out of contact with the same, said base plate serving as the support for the said insulating material, and with the plane of the active surface extending to at least one plane of the ring of insulating material, in combination with a metal spacing washer or gasket compressed between such two halves.

33. A quenched spark-gap unit, composed of two similar halves, each having a metal base plate, with a projection on one side having an active surface, and a ring of insulating material in contact with the same side only of said base plate, and surrounding the active surface, and with the plane of the active surface extending to at least the plane of the ring of insulating material, in combination with a metal spacing washer or gasket compressed between such two halves.

34. A quenched spark-gap unit, composed of two similar halves, each having a metal base plate, with a projection on one side having an active surface, and a ring of insulating material in contact with the same side only of said base plate, and surrounding the active surface and out of contact with the same, and with the plane of the active surface extending to at least the plane of the ring of insulating material, in combination with a metal spacing washer or gasket compressed between such two halves.

35. A quenched spark-gap unit, composed of two similar halves, each having a metal base plate, with a projection on one side having an active surface, and a ring of insulating material in contact with the same side only of said base plate, and secured thereto, and surrounding the active surface, and with the plane of the active surface extending to at least the plane of the ring of insulating material, in combination with a metal spacing washer or gasket compressed between such two halves.

36. A quenched spark-gap unit, composed of two similar halves, each having a metal base plate, with a projection on one side having an active surface, and a ring of insulating material in contact with the same side only of said base plate, and secured thereto, and surrounding the active surface, and out of contact with the same, and with the plane of the active surface extending to at least the plane of the ring of insulating material, in combination with a metal spacing washer or gasket compressed between such two halves.

37. A quenched spark gap unit, composed of two similar halves, each having a metal base plate, with a projecting active surface on one side of said plate, a ring of insulating material in contact with the same side of said plate and surrounding the active surface, and a metal ring on the side of the insulating ring opposite from the base plate, and out of contact with the active surface, in combination with a metal spacing washer or gasket compressed between such two halves.

38. A quenched spark gap unit, composed of two similar halves, each having a metal base plate, with a projecting active surface on one side of said plate, a ring of insulating material in contact with the same side of said plate and surrounding the active surface, and out of contact with the same, and a metal ring on the side of the insulating ring opposite from the base plate, and out of contact with the active surface, in combination with a metal spacing washer or gasket compressed between such two halves.

39. A quenched spark gap unit, composed of two similar halves, each having a metal base plate with a projecting active surface on one side of said plate, a ring of insulating material in contact with the same side of said plate and secured thereto, and surrounding the active surface, and a metal ring opposite from the base plate, and out of contact with the active surface, in combination with a metal spacing washer or gasket compressed between such two halves.

40. A quenched spark gap unit, composed of two similar halves, each having a metal base plate with a projecting active surface on one side of said plate, a ring of insulating material in contact with the same side of said base plate and secured thereto, and surrounding the active surface and out of contact with the same, and a metal ring opposite from the base plate, and out of contact with the active surface, in combination with a metal spacing washer or gasket compressed between such two halves.

41. A quenched spark gap, composed of a plurality of units, each composed of two similar halves, each of which has a metal base plate, with a projecting active surface on one side of the same, a ring of insulating material in contact with the same side of said plate and surrounding the active surface, and lying wholly within the periphery of the base plate, and a metal spacing washer or gasket compressed between such halves, in combination with a metal cooling plate associated with the base plates of contiguous units on the sides thereof opposite from the active surfaces.

42. A quenched spark gap, composed of a plurality of units, each composed of two similar halves, each of which has a metal base plate, with a projecting active surface on one side of the same, a ring of insulating material in contact with the same side of said plate, and surrounding the active surface, and out of contact therewith, and lying wholly within the periphery of the base plate, and a metal spacing washer or gasket compressed between such halves, in combination with a metal cooling plate associated with the base plates of contiguous units on the sides thereof opposite from the active surfaces.

43. A quenched spark gap, composed of a plurality of units, each composed of two similar halves, each of which has a metal base plate, with a projecting active surface on one side of the same, a ring of insulating material in contact with the same side of said plate and secured thereto, and surrounding the active surface, and lying wholly within the periphery of the base plate, and a metal spacing washer or gasket compressed between such halves, in combination with a metal cooling plate associated with the base plates of contiguous units on the sides thereof opposite from the active surfaces.

44. A quenched spark gap, composed of a plurality of units, each composed of two similar halves, each of which has a metal base plate, with a projecting active surface on one side of the same, a ring of insulating material in contact with the same side of said plate and secured thereto, and surrounding the active surface and out of contact with the same, and lying wholly within the periphery of the base plate, and a metal spacing washer or gasket compressed between such halves, in combination with a metal cooling plate associated with the base plates of contiguous units on the sides thereof opposite from the active surfaces.

45. A quenched spark-gap, composed of a plurality of units, each composed of two similar halves, each of which has a metal base plate, with a projecting active surface on one side of the same, a ring of insulating material in contact with the same side of said plate and surrounding the active surface, said base plate serving as the support for the said insulating material, and a metal spacing washer or gasket compressed between such halves, in combination with a metal cooling plate associated with the base plates of contiguous units on the sides thereof opposite from the active surfaces.

46. A quenched spark-gap, composed of a plurality of units, each composed of two similar halves, each of which has a metal base plate, with a projecting active surface on one side of the same, a ring of insulating material in contact with the same side of said plate, and surrounding the active surface, and out of contact therewith, said base plate serving as the support for the said insulating material, and a metal spacing washer or gasket compressed between such halves, in combination with a metal cooling plate associated with the base plates of contiguous units on the sides thereof opposite from the active surfaces.

47. A quenched spark-gap, composed of a plurality of units, each composed of two similar halves, each of which has a metal base plate, with a projecting active surface on one side of the same, a ring of insulating material in contact with the same side of said plate and secured thereto, and surrounding the active surface, said base plate serving as the support for the said insulating material, and a metal spacing washer or gasket compressed between such halves, in combination with a metal cooling plate associated with the base plates of contiguous units on the sides thereof opposite from the active surfaces.

48. A quenched spark-gap, composed of a plurality of units, each composed of two similar halves, each of which has a metal base plate, with a projecting active surface on one side of the same, a ring of insulating material in contact with the same side of said plate and secured thereto, and surrounding the active surface and out of contact with the same, said base plate serving as the support for the said insulating material, and a metal spacing washer or gasket compressed between such halves, in combination with a metal cooling plate associated with the base plates of contiguous units on the sides thereof opposite from the active surfaces.

49. A quenched spark-gap, composed of a plurality of units, each composed of two similar halves, each of which has a metal base plate, with a projection on one side having an active surface, a ring of insulating material in contact with the same side only of said plate and surrounding the active surface, and with the plane of the active surface extending to at least the plane of the ring of insulating material, and a metal spacing washer or gasket compressed between such halves, in combination with a metal cooling plate associated with the base plates of contiguous units on the sides thereof opposite from the active surfaces.

50. A quenched spark-gap, composed of a plurality of units, each composed of two similar halves, each of which has a metal base plate, with a projection on one side having an active surface, a ring of insulating material in contact with the same side only of said plate, and surrounding the active surface, and out of contact therewith, and with the plane of the active surface extending to at least the plane of the ring of insulating material, and a metal spacing washer or gasket compressed between such halves, in combination with a metal cooling plate associated with the base plates of contiguous units on the sides thereof opposite from the active surfaces.

51. A quenched spark-gap, composed of a plurality of units, each composed of two similar halves, each of which has a metal base plate, with a projection on one side having an active surface, a ring of insulating material in contact with the same side only of said plate and secured thereto, and surrounding the active surface, and with the plane of the active surface extending to at least the plane of the ring of insulating material, and a metal spacing washer or gasket compressed between such halves, in combination with a metal cooling plate associated with the base plates of contiguous units on the sides thereof opposite from the active surfaces.

52. A quenched spark-gap, composed of a plurality of units, each composed of two similar halves, each of which has a metal base plate, with a projection on one side having an active surface, a ring of insulating material in contact with the same side only of said plate and secured thereto, and surrounding the active surface and out of contact with the same, and with the plane of the active surface extending to at least the plane of the ring of insulating material, and a metal spacing washer or gasket compressed between such halves, in combination with a metal cooling plate associated with the base plates of contiguous units on the sides thereof opposite from the active surfaces.

53. A quenched spark gap, composed of a plurality of units, each composed of two similar halves, each of which has a metal base plate, with a projecting active surface on one side of the same, a ring of insulating material in contact with the same side of said plate and surrounding the active surface, and a metal ring on the side of the insulating ring opposite from the base plate, and out of contact with the active surface, and a metal spacing washer or gasket compressed between such halves, in combination with a metal cooling plate associated with the base plates of contiguous units on the sides thereof opposite from the active surfaces.

54. A quenched spark gap, composed of a plurality of units, each composed of two similar halves, each of which has a metal base plate, with a projecting active surface on one side of the same, a ring of insulating material in contact with the same side of said plate and surrounding the active surface and out of contact therewith, and a metal ring on the side of the insulating ring opposite from the base plate and out of contact with the active surface, and a metal spacing washer or gasket compressed between such halves, in combination with a metal cooling plate associated with the base plates of contiguous units on the sides thereof opposite from the active surfaces.

55. A quenched spark gap composed of a plurality of units, each composed of two similar halves, each of which has a metal base plate with a projecting active surface on one side of the same, a ring of insulating material in contact with the same side of said plate and secured thereto, and surrounding the active surface, and a metal ring on the side of the insulating ring opposite from the base plate, and out of contact with the active surface, and a metal spacing washer or gasket compressed between such halves, in combination with a metal cooling plate associated with the base plates of contiguous units on the sides thereof opposite from the active surfaces.

56. A quenched spark gap composed of a plurality of units, each composed of two similar halves, each of which has a metal base plate with a projecting active surface on one side of same, a ring of insulating material in contact with the same side of said base plate and secured thereto, and surrounding the active surface, and out of contact therewith, and a metal ring on the side of the insulating ring opposite from the base plate, and out of contact with the active surface, and a metal spacing washer or gasket compressed between such halves, in combination with a metal cooling plate associated with the base plates of contiguous units on the sides thereof opposite from the active surfaces.

This specification signed and witnessed this 29th day of December, 1913.

RICHARD PFUND.

Witnesses:
J. F. COLEMAN,
ANNA E. RENTON.

Copies of this patent may be obtained for five cents each, by addressing the "Commissioner of Patents, Washington, D. C."